United States Patent
Takahashi

(10) Patent No.: US 9,395,601 B2
(45) Date of Patent: Jul. 19, 2016

(54) IMAGE PICKUP APPARATUS HAVING LIGHT EMITTING SECTION

(71) Applicant: CANON KABUSHIKI KAISHA, Tokyo (JP)

(72) Inventor: Tomoki Takahashi, Kamagaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/595,472

(22) Filed: Jan. 13, 2015

(65) Prior Publication Data

US 2015/0198863 A1 Jul. 16, 2015

(30) Foreign Application Priority Data

Jan. 14, 2014 (JP) .................................. 2014-004244

(51) Int. Cl.
*G03B 15/05* (2006.01)
*H04N 5/225* (2006.01)

(52) U.S. Cl.
CPC .............. *G03B 15/05* (2013.01); *H04N 5/2252* (2013.01); *H04N 5/2254* (2013.01); *H04N 5/2256* (2013.01)

(58) Field of Classification Search
None
See application file for complete search history.

(56) References Cited

U.S. PATENT DOCUMENTS

| | | | | |
|---|---|---|---|---|
| 5,749,003 A * | 5/1998 | Tanabe | ................... | G03B 15/05 396/177 |
| 6,104,882 A * | 8/2000 | Inazuka | ................. | G03B 15/05 396/177 |
| 6,351,609 B1 * | 2/2002 | Hosokawa | ............. | G03B 15/03 396/177 |
| 6,606,459 B2 * | 8/2003 | Kobayashi | ............. | G03B 15/03 396/177 |
| 6,909,847 B2 * | 6/2005 | Ujikane | ................. | G03B 15/03 396/178 |

(Continued)

FOREIGN PATENT DOCUMENTS

JP 2011-070167 A 4/2011
JP 5078967 B 11/2012

*Primary Examiner* — Michael Osinski
(74) *Attorney, Agent, or Firm* — Cowan, Liebowitz & Latman, P.C.

(57) ABSTRACT

A mechanism capable of preventing a movable member from being lifted up from an apparatus body when it is in its retracted position within the apparatus body. The movable member having a light emission unit is moved between a retracted position and a light emission position. A link member has one end pivotally supported by the apparatus body and the other end pivotally supporting the movable member. The link member is urged toward the apparatus body by a torsion spring, and the movable member is urged toward the link member by a tensile spring. A lock lever locks an engaging pawl of the movable member against urging forces of the respective springs when the light emission unit is in the retracted position, and a lock plate locks a restriction portion of the movable member against the urging forces of the respective springs.

5 Claims, 12 Drawing Sheets

(56) References Cited

U.S. PATENT DOCUMENTS

| | | | |
|---|---|---|---|
| 6,999,676 B2* | 2/2006 | Hsien | G03B 15/06 396/177 |
| 7,352,963 B2* | 4/2008 | Hamano | G03B 15/05 348/371 |
| 7,406,258 B2* | 7/2008 | Yamada | G03B 15/03 348/371 |
| 7,412,161 B2* | 8/2008 | Yamada | G03B 15/05 348/371 |
| 7,756,414 B2* | 7/2010 | Deng | G03B 15/03 396/177 |
| 7,778,541 B2* | 8/2010 | Nishikawa | G03B 15/03 396/177 |
| 7,855,746 B2* | 12/2010 | Iwasaki | G02B 7/102 348/357 |
| 8,131,147 B2* | 3/2012 | Kusatsugu | G03B 15/05 396/177 |
| 8,249,442 B2* | 8/2012 | Yasuda | G03B 15/05 396/176 |
| 8,280,240 B2* | 10/2012 | Sotsu | G03B 17/00 396/177 |
| 8,326,138 B2* | 12/2012 | Yoshii | G02B 7/282 396/177 |
| 8,521,018 B2* | 8/2013 | Akiyama | G03B 15/05 396/177 |
| 8,681,266 B2* | 3/2014 | Lim | H04N 5/2256 348/222.1 |
| 8,744,259 B2* | 6/2014 | Yoon | G03B 15/05 348/371 |
| 8,827,471 B2* | 9/2014 | Mitani | G03B 15/03 362/253 |
| 8,878,985 B2* | 11/2014 | Lin | H04N 5/2256 348/371 |
| 2004/0071459 A1* | 4/2004 | Ujikane | G03B 15/03 396/178 |
| 2005/0200745 A1* | 9/2005 | Lee | G03B 15/05 348/371 |
| 2009/0103911 A1* | 4/2009 | Ikemizo | G03B 15/05 396/174 |
| 2010/0060775 A1* | 3/2010 | Shintani | H04N 5/2252 348/335 |
| 2010/0284676 A1* | 11/2010 | Shintani | H04N 5/2354 396/175 |
| 2011/0002686 A1* | 1/2011 | Kusatsugu | G03B 15/05 396/535 |
| 2011/0052171 A1* | 3/2011 | Yasuda | G03B 15/05 396/176 |
| 2011/0085787 A1* | 4/2011 | Z Ka | G03B 15/02 396/198 |
| 2011/0182569 A1* | 7/2011 | Momose | G03B 15/05 396/178 |
| 2015/0036360 A1* | 2/2015 | Yamashita | G03B 15/03 362/373 |
| 2015/0215506 A1* | 7/2015 | Mochinushi | G03B 15/02 348/374 |

* cited by examiner

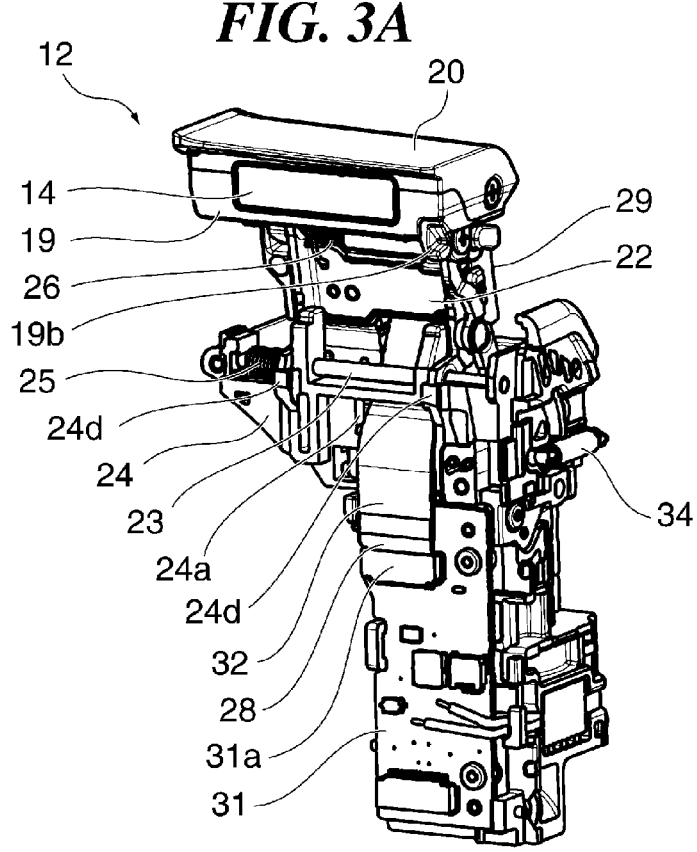
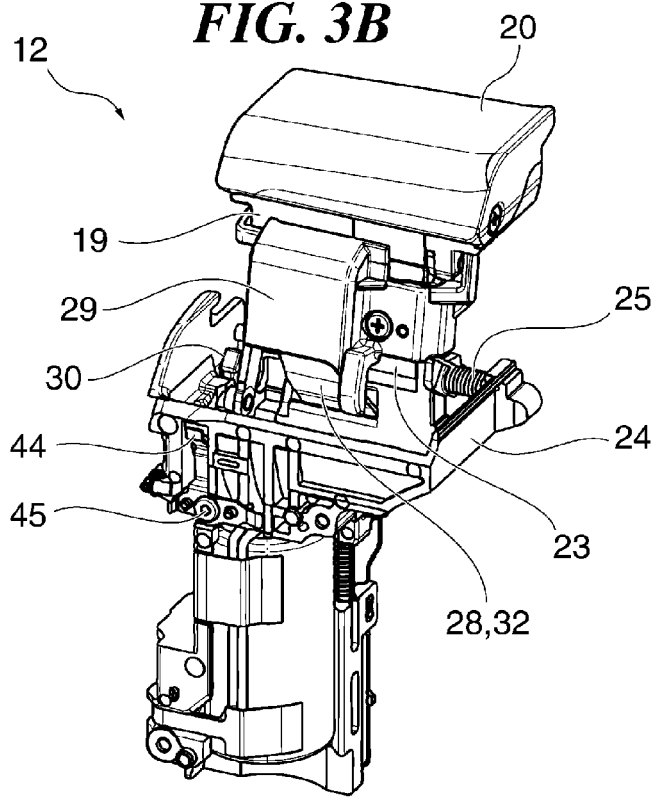

IMAGE PICKUP APPARATUS HAVING LIGHT EMITTING SECTION

BACKGROUND OF THE INVENTION

1. Field of the Invention

The invention relates to an image pickup apparatus, such as a digital camera, and more particularly to an image pickup apparatus having a light emitting section, such as a strobe unit.

2. Description of the Related Art

As an image pickup apparatus, such as a digital camera, there has been known one which is provided with a so-called pop-up strobe unit configured to move a movable member having a strobe light-emitting part between a retracted position where the movable member is retracted within an apparatus body and a light emission position where the movable member protrudes out of the apparatus body. As a mechanism for moving the movable member from the retracted position within the apparatus body to the light emission position, there has been known one which uses a link mechanism for causing the movable member to be moved higher upward from the apparatus body to a position facing an object, using two rotating shafts.

For example, there has been proposed a technique employing a link mechanism for pivotally linking one end of a linking member to a movable member having a light emitting section and pivotally connecting the other end of the linking member to an apparatus body (see Japanese Patent Laid-Open Publication No. 2011-70167).

Further, there has been proposed a technique employing a link mechanism for pivotally connecting one end of a support to a movable member having a light emitting section and pivotally connecting the other end of the support to an apparatus body (see Japanese Patent Publication No. 5078967). In this technique, the link mechanism is provided with a locking part for locking the support and another locking part for locking the movable member such that the movable member can be selectively moved between a normal light emission position where strobe light is emitted toward an object and a so-called bounce light emission position where strobe light is emitted toward an upper surface of a camera.

In both of Japanese Patent Laid-Open Publication No. 2011-70167 and Japanese Patent Publication No. 5078967, two coil springs are used to urge the movable member toward the light emission position. In Japanese Patent Laid-Open Publication No. 2011-70167, the urging forces of the respective two coil springs are received by bringing a locked portion formed on the movable member into locking engagement with a locking portion formed on a non-movable member, whereby the movable member is held in its retracted position. However, when the locking portion for holding the movable member in its retracted position against the urging forces of the two coil springs is provided at a single location, there is a fear that a portion of the upper surface of the movable member toward the front or rear of the apparatus body can be lifted up from the apparatus body by the urging forces of the two coil springs.

On the other hand, in Japanese Patent Publication No. 5078967, the movable member is brought into locking engagement with the apparatus body, and a pawl portion provided in the support member locks the movable member, whereby the urging forces of the two coil springs are received at two locations so as to hold the movable member in its retracted position. However, since the movable member is in indirect locking engagement with the apparatus body, the accuracy of components can have a considerable adverse influence on the link mechanism. Further, the urging forces of the two coil springs can lift up the movable member from the upper surface of the apparatus body or cause a level difference or the like between the movable member and the upper surface of the apparatus body.

When the movable member in its retracted position is lifted up from the apparatus body or a level difference is caused between the movable member and the apparatus body as described above, the appearance of the associated camera is degraded due to lack of impression of precision. In this case, the above-mentioned problems can be solved by improving the dimensional accuracy of each component part. However, the improvement of the dimensional accuracy causes an increase in manufacturing costs.

SUMMARY OF THE INVENTION

The invention provides a mechanism which is capable of preventing, in a case where a support mechanism having two rotating shafts is used to move a movable member having a light emitting section between a retracted position and a light emission position, the movable member from being lifted up from an apparatus body or a level difference from being generated between the movable member and the apparatus body when the movable member is in the retracted position, at a low cost.

The invention provides an image pickup apparatus including a light emitting section configured to move between a retracted position where the light emitting section is retracted in an apparatus body and a light emission position where the light emitting section protrudes from the apparatus body, comprising a movable member having the light emitting section, a support member having one end pivotally supported by the apparatus body and the other end pivotally supporting the movable member, a first urging member configured to urge the support member toward the apparatus body, a second urging member configured to urge the movable member toward the support member, a first locking member configured to lock a first locked portion formed in one end of the movable member against urging forces of the respective first and second urging members when the light emitting section is in the retracted position, and a second locking member configured to lock a second locked portion formed in the other end of the movable member against the urging forces of the respective first and second urging members in a case where the light emitting section is in the retracted position, wherein in a case where the light emitting section is in the retracted position, release of locking engagement between the first locking member and the first locked portion causes the movable member to be pivotally moved with respect to the support member by the urging force of the second urging member, and wherein the pivotal movement of the movable member with respect to the support member releases locking engagement between the second locking member and the second locked portion, and the support member is pivotally moved with respect to the apparatus body by the urging force of the first urging member, whereby the light emitting section is positioned in the light emission position.

According to the invention, it is possible to prevent the movable member from being lifted from the apparatus body and a level difference between the movable member and the apparatus body from being generated, at a low cost, in a case where the support mechanism having the two rotating shafts is used to move the movable member having the light emitting section between the retracted position and the light emission position.

Further features of the invention will become apparent from the following description of exemplary embodiments (with reference to the attached drawings).

BRIEF DESCRIPTION OF THE DRAWINGS

FIG. 3A is a perspective view of the appearance of the strobe unit, as viewed from the front side of the camera, with the movable member in the light emission position.

FIG. 3B is a perspective view of the appearance of the strobe unit in FIG. 3A, as viewed from the rear side of the camera.

DESCRIPTION OF THE EMBODIMENTS

The invention will now be described in detail below with reference to the accompanying drawings showing embodiments thereof.

Figure 1A:
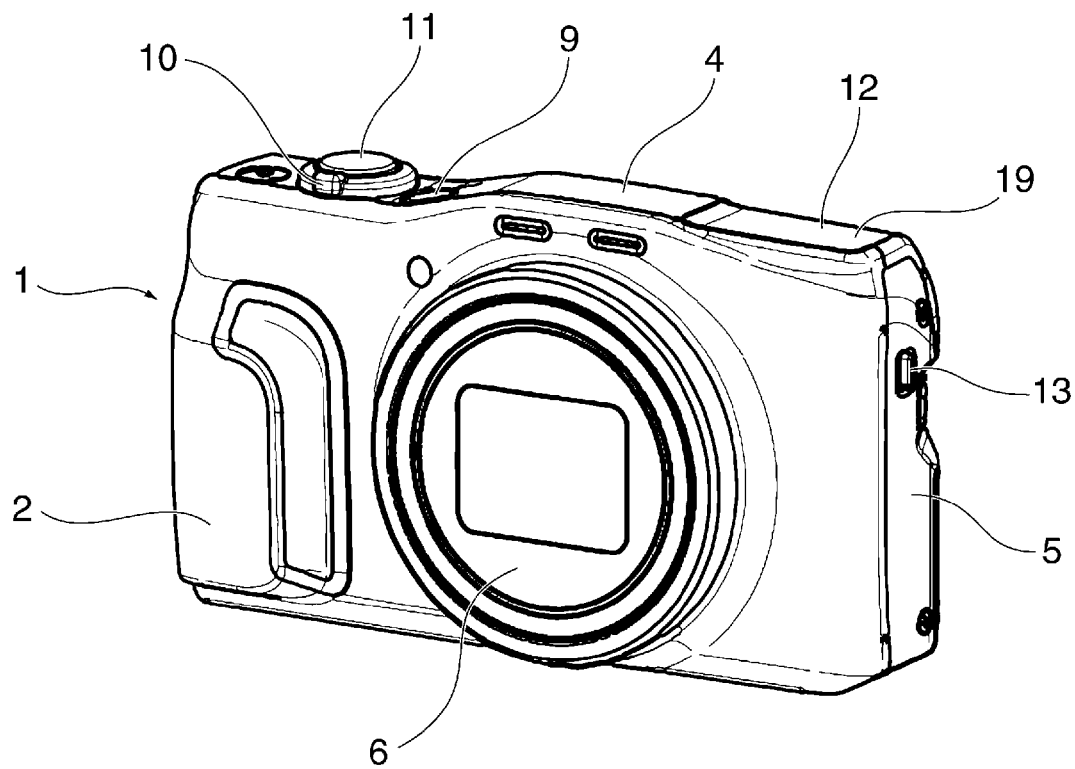
FIG. 1A is a perspective view of a digital camera, as viewed from a front side (object side) thereof, which is an image pickup apparatus according an embodiment of the invention.
Figure 1B:
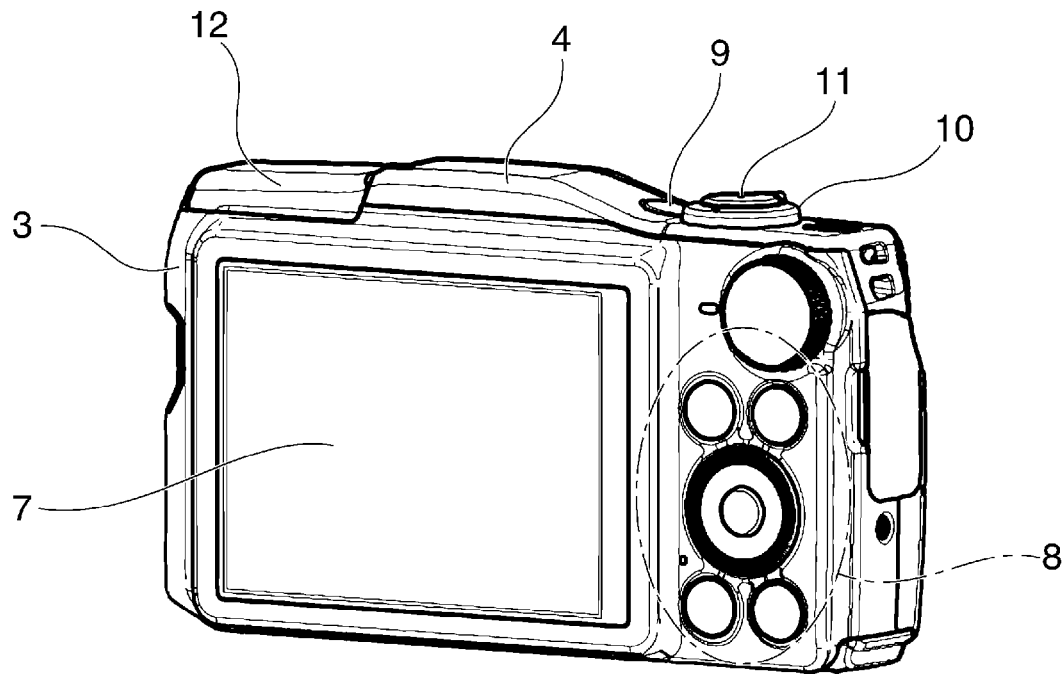
FIG. 1B is a perspective view of the digital camera shown in FIG. 1A, as viewed from a rear side.
Figure 2:
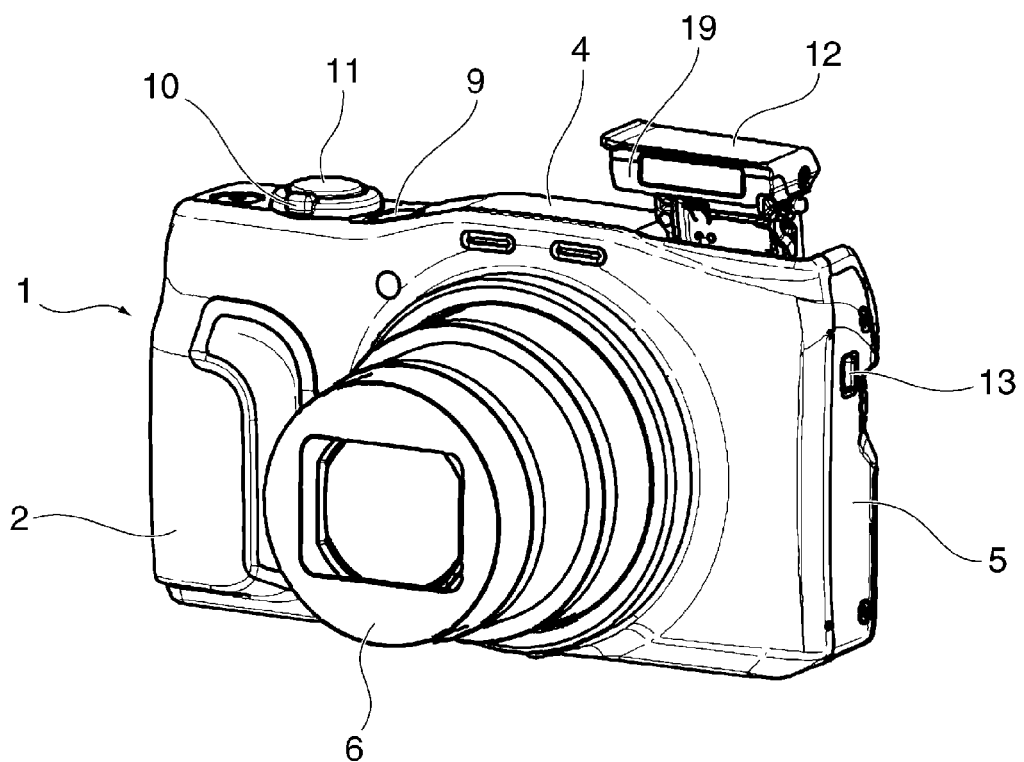
FIG. 2 is a perspective view of the digital camera in FIG. 1A with a movable member of a strobe unit thereof moved to a light emission position.

FIG. 1A is a perspective view of a digital camera, as viewed from a front side (object side) thereof, which is an image pickup apparatus according to an embodiment of the invention, and FIG. 1B is a rear perspective view of the digital camera shown in FIG. 1A. FIG. 2 is a perspective view of the digital camera in FIG. 1A with a movable member of a strobe unit thereof moved to a light emission position.

As shown in FIGS. 1A, 1B, and 2, the digital camera of the present embodiment has a camera body 1 which corresponds to an apparatus body of the invention, and the camera body 1 has an exterior thereof formed by a front cover 2, a rear cover 3, an upper cover 4, and a side cover 5. On a front surface of the camera body 1, there is disposed a lens barrel 6, and on a rear surface of the camera body 1, there are arranged a display unit 7 and an operation section 8.

On the upper surface of the camera body 1, there are arranged a power switch 9, a zoom lever 10, a release button 11, and the strobe unit 12. The strobe unit 12 corresponds to an example of a light emitting device of the invention, and is a so-called popup type in which a movable member 19 having a light emission unit 14 (see FIGS. 3A and 3B) is moved between a retracted position (see FIGS. 1A and 1B) where the movable member 19 is retracted in the camera body 1 and a light emission position (see FIG. 2) where the movable member 19 protrudes from the camera body 1.

On a right side surface of the camera body 1, as viewed from the front thereof, there is disposed a release lever 13. When the release lever 13 is operated in a state shown in FIGS. 1A and 1B, the movable member 19 of the strobe unit 12 is unlocked, whereby the movable member 19 is caused to protrude from the upper surface of the camera body 1, as shown in FIG. 2, in such a manner that it is popped up to the light emission position. In short, the release lever 13 functions as an operation member.

When the power switch 9 is turned on, the lens barrel 6 is extended toward the object side, and a focal length (optical zoom magnification) can be adjusted by operating the zoom lever 10. The display unit 7 not only displays an image to be photographed for confirmation or displays a recorded image, but also displays various kinds of information required for photographing, such as icons and guides, so as to prompt a photographer to cause the movable member 19 of the strobe unit 12 to be popped up to the light emission position, e.g. when an object to be photographed is dark.

Next, the strobe unit 12 will be described with reference to FIGS. 3A to 12B.

Figure 4A:
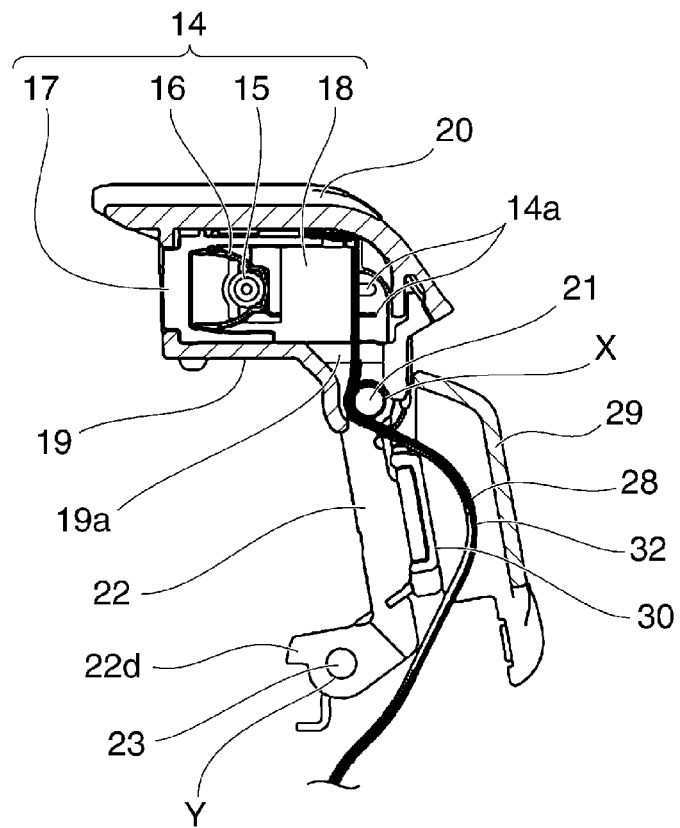
FIG. 4A is a side view, partly broken away, of essential parts of the strobe unit with the movable member thereof in the light emission position.
Figure 4B:
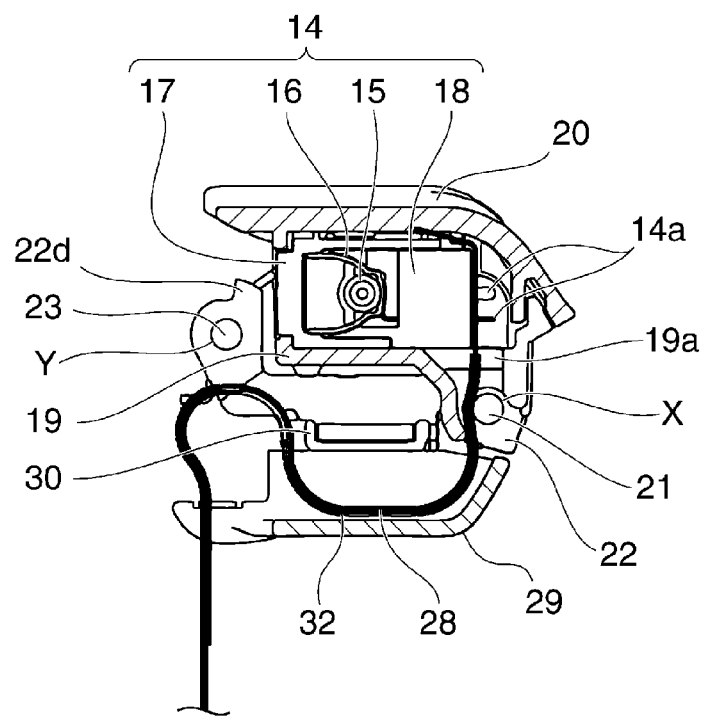
FIG. 4B is a side view, partly broken away, of the essential parts of the strobe unit with the movable member thereof in a retracted position.

FIG. 3A is a perspective view of the appearance of the strobe unit 12, as viewed from the front side of the camera, with the movable member 19 in the light emission position, and FIG. 3B is a perspective view of the appearance of the strobe unit 12 shown in FIG. 3A, as viewed from the rear side of the camera. FIG. 4A is a side view, partly broken away, of essential parts of the strobe unit 12 with the movable member 19 in the light emission position, and FIG. 4B is a side view, partly broken away, of the essential parts of the strobe unit 12 with the movable member 19 in the retracted position.

As shown in FIGS. 3A and 3B and FIGS. 4A and 4B, the strobe unit 12 is provided with the movable member 19 having the light emission unit 14. The movable member 19 is movable between the retracted position (see FIGS. 1A and 1B) wherein the movable member 19 is retracted within the camera body 1 and the light emission position (see FIG. 2) where the strobe unit 12 protrudes from the camera body 1, as mentioned hereinabove.

The light emission unit 14 includes a xenon tube 15, a reflector 16, a Fresnel cover 17, a protective cover 18, and forth, as internal components. The movable member 19 has an upper surface thereof covered by a cover member 20. Note that the light emission unit 14 corresponds to a light emitting section of the invention. The Fresnel cover 17 functions as a light emission surface formed in one end of the movable member.

The movable member 19 is pivotally connected to a link member 22 by a shaft 21 (hereinafter referred to as the connection part X). The link member 22 is pivotally connected to a base member 24 by a shaft 23 (hereinafter referred to as the connection part Y). In short, the link member 22 functions as a support member having one end pivotally supported on the apparatus body and the other end pivotally supporting the movable member.

The light emission unit 14 has four terminals 14a protruding therefrom, and the terminals 14a are connected to two electrodes of the xenon tube 15 and a trigger coil (not shown) and are rigidly soldered to a flexible printed wiring board 28. Thus, electric power is supplied to the light emission unit 14 through the flexible printed wiring board 28.

The flexible printed wiring board 28 is led out from between an opening 19a formed in the movable member 19 and the shaft 21. The flexible printed wiring board 28 led out passes through between a protective member 29 and a protective member 30 which are rigidly secured to the link member 22, passes through an opening 24a formed in the base member 24, and is inserted into a connector 31a on a strobe board 31.

The flexible printed wiring board 28 is partially exposed to the outside when the movable member 19 is in the light emission position, and hence the flexible printed wiring board 28 is subjected to insulating treatment by causing an insulation sheet 32 to be wound two and half turns around the flexible printed wiring board 28 so as to prevent the user from touching any high-voltage part thereof.

The connection part Y incorporates a torsion spring 25 (hereinafter simply referred to as the spring 25) which corresponds to a first urging member of the invention. The spring 25 urges the link member 22 in a counterclockwise direction, as viewed in FIGS. 4A and 4B, with respect to the base member 24. The base member 24 and the link member 22 are formed with respective abutment portions 24d and 22d which are brought into abutment with each other. The abutment between the abutment portions 24d and 22d restricts the position of the link member 22 to the light emission position shown in FIG. 4A, and prevents the link member 22 from being further rotated counterclockwise.

Further, the connection part X incorporates a torsion spring 26 (hereinafter simply referred to as the spring 26) which corresponds to a second urging member of the invention. The spring 26 urges the movable member 19 in a clockwise direction, as viewed in FIGS. 4A and 4B, with respect to the link member 22. The movable member 19 and the link member 22 are formed with respective abutment portions, not shown, which are brought into abutment with each other. The abutment between the abutment portions restricts the position of the movable member 19 to the light emission position shown in FIG. 4A and prevents the movable member 19 from being further rotated clockwise. This causes the movable member 19 and the link member 22 to be held in respective attitudes shown in FIG. 4A.

Figure 9A:
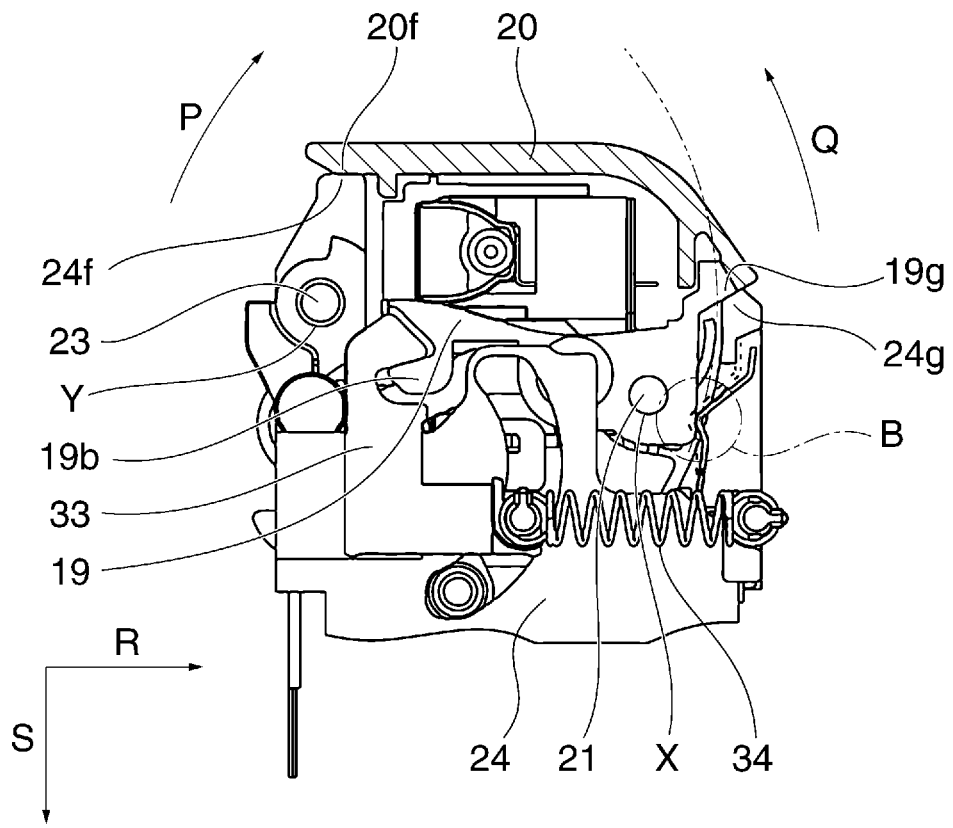
FIG. 9A is a side view, partly broken away, of the strobe unit with the movable member thereof in the retracted position.

When the user presses the cover member 20 of the movable member 19 against the urging forces of the springs 26 and 25, the movable member 19 and the link member 22 are folded into the retracted position shown in FIG. 4B. When the movable member 19 is moved close to the retracted position, as shown in FIG. 9A, a lock lever 33 is brought into engagement with an engaging pawl 19b formed in a front side (one end) of the movable member 19, whereby the movable member 19 is pulled into the position shown in FIG. 4B. In short, the engaging pawl 19b functions as a first locked portion formed on one end of the movable member, and the lock lever 33 functions as a first locking member configured to lock the first locked portion.

Figure 9B:
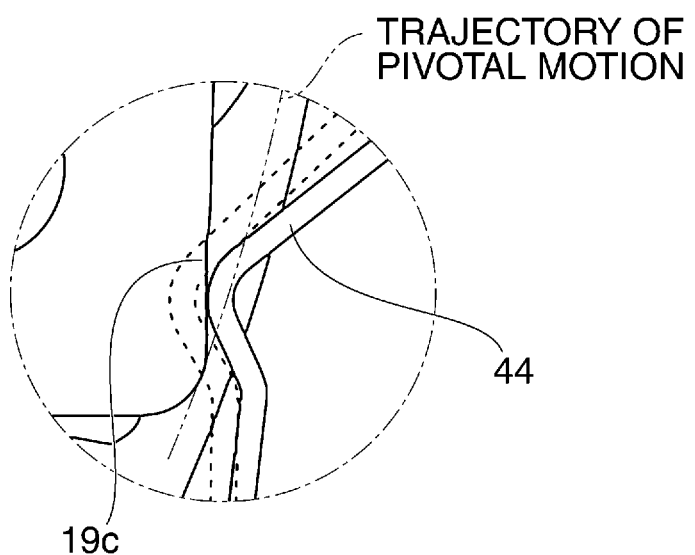
FIG. 9B is a partial enlarged view of a portion of FIG. 9A.

The lock lever 33 performs pulling of the movable member 19 into the retracted position and holding of the same thereat by a tensile load of a tensile spring 34. The tensile spring 34 has one end thereof hooked to the lock lever 33 and the other end thereof hooked to the base member 24. A lock plate 44 appearing e.g. in FIGS. 3B and 9B is formed by a leaf spring having elasticity, and is rigidly secured to the base member 24 with a screw 45.

Next, the link mechanism of the strobe unit 12 will be described with reference to FIGS. 5A and 5B.

Figure 5A:
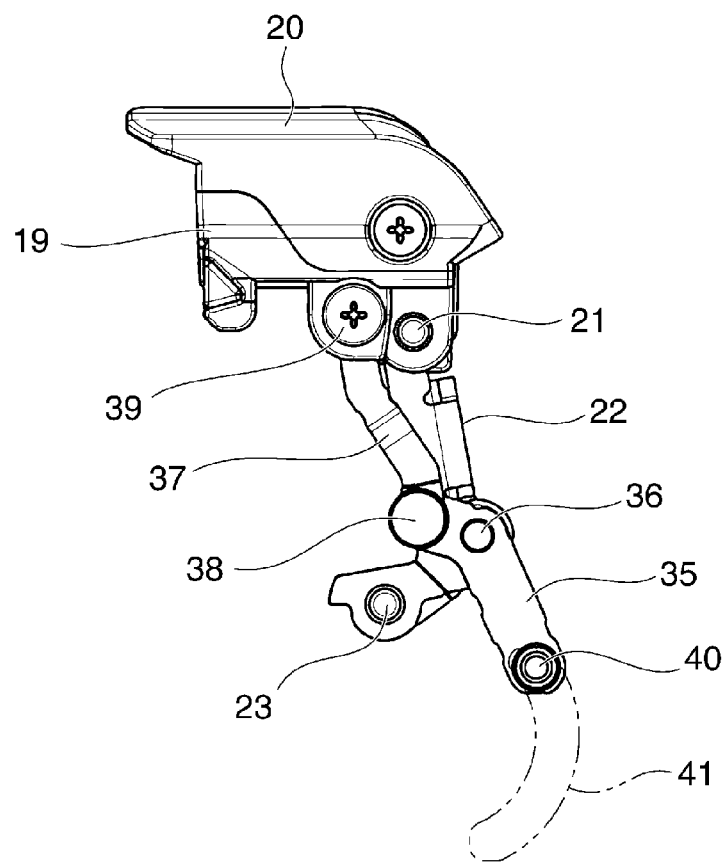
FIG. 5A is a side view of a link mechanism of the strobe unit with the movable member thereof in the light emission position.
Figure 5B:
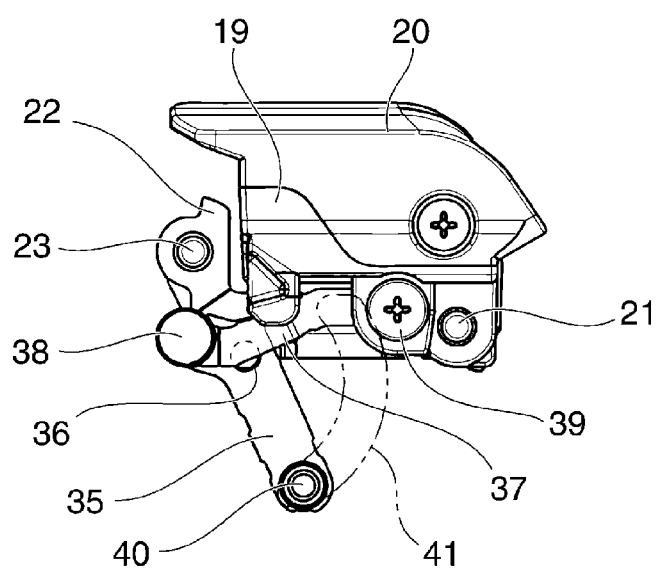
FIG. 5B is a side view of the link mechanism of the strobe unit with the movable member thereof in the retracted position.

FIG. 5A is a side view of the link mechanism of the strobe unit 12 with the movable member 19 in the light emission position, and FIG. 5B is a side view of the same with the movable member 19 in the retracted position.

As shown in FIGS. 5A and 5B, the link member 22 has a link member 35 pivotally connected thereto with a caulking pin 36. The link member 35 has a link member 37 pivotally connected thereto with a caulking pin 38, and the link member 37 is pivotally connected to the movable member 19 with a shoulder screw 39. Thus, a four-joint link mechanism having four shafts, i.e. the shaft 21, the caulking pin 36, the caulking pin 38, and the shoulder screw 39, as joints, is formed.

The movable member 19 is supported by the above-described link mechanism in a manner movable between the light emission position and the retracted position, and pivotally moves about the shaft 21 in a manner interlocked with pivotal movement of the link member 35 about the caulking pin 36.

A follower pin 40 is rigidly secured to one end of the link member 35 opposite from the caulking pin 38, in a caulked manner. The follower pin 40 is inserted in a cam groove 41 formed in the base member 24 such that it is engaged with the cam groove 41 in a manner movable along the cam surfaces of the cam groove 41 via an elastic member 42, described hereinafter.

Therefore, the pivotal movement of the link member 35 is restricted in terms of the degree of freedom by the follower pin 40 engaged with the cam groove 41, and the degree of freedom of the pivotal movement of the movable member 19 which moves in a manner interlocked with the link member 35 is also restricted. This makes it possible to prevent the engaging pawl 19b e.g. from being brought into contact with the front cover 2 and thereby damaging the same during an operation for retracting the movable member 19 of the strobe unit 12 from the light emission position to the retracted position.

Figure 6A:
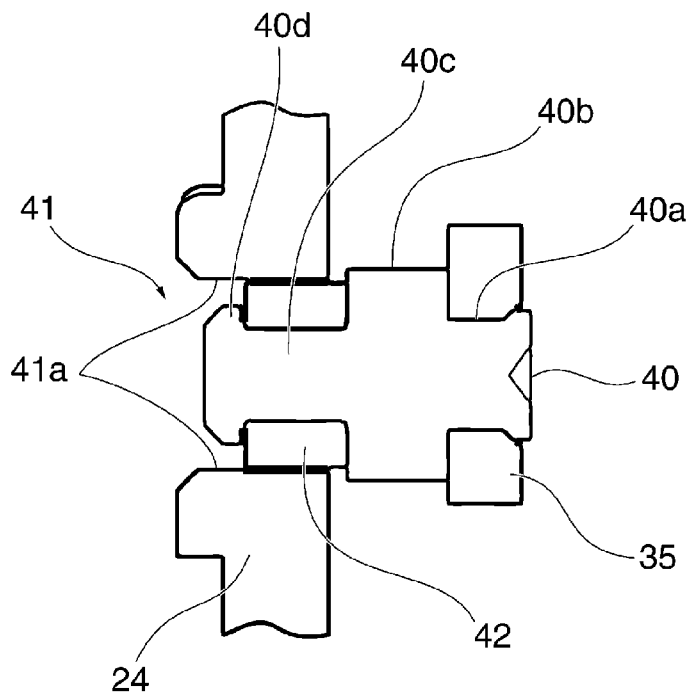
FIG. 6A is a cross-sectional view of essential parts of the link mechanism with a follower pin inserted in a cam groove.

FIG. 6A is a cross-sectional view of essential parts of the link mechanism with the follower pin 40 inserted in the cam groove 41.

As shown in FIG. 6A, the follower pin 40 includes a caulked portion 40a caulked into the link member 35, a base portion 40b which is not inserted into the cam groove 41, and a follower portion 40c which is inserted into the cam groove 41. The follower portion 40c is formed smaller in diameter than the base portion 40b, and has a front end thereof formed with an increased diameter portion 40d which is larger in diameter than the follower portion 40c.

The elastic member 42 which has a hollow cylindrical shape and is made of e.g. rubber is fitted on an outer periphery of the follower portion 40c in a manner rotatable about the follower portion 40c. The increased diameter portion 40d has an outer diameter which is smaller than the outer diameter of the elastic member 42 and larger than the inner diameter of the elastic member 42, and hence the elastic member 42 cannot come off from the follower pin 40.

Further, the cam groove 41 has a groove width which is larger than the outer diameter of the elastic member 42, so that the follower portion 40c of the follower pin 40 can move along the cam groove 41 without frictional load during movement of the movable member 19 of the strobe unit 12 between the light emission position and the retracted position.

Figure 6B:
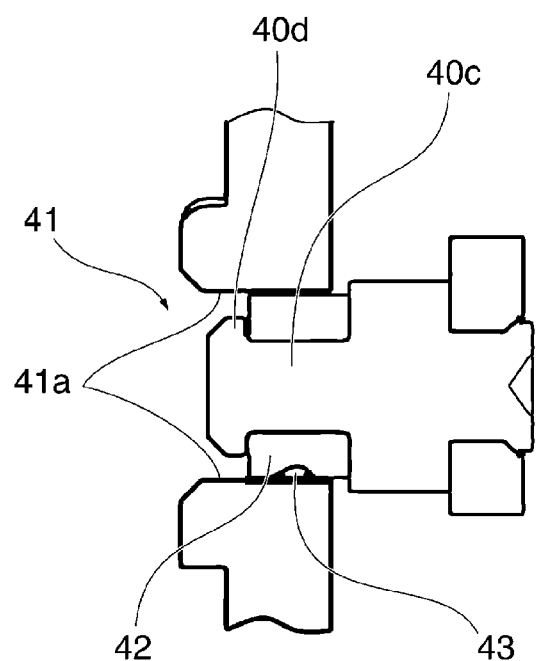
FIG. 6B is a cross-sectional view of the essential parts of the link mechanism with a follower portion of the follower pin passing over a hard foreign matter, such as sand, attached to a cam surface of the cam groove.

The follower portion 40c moves along the cam groove 41 while moving along the cam surfaces 41a, appearing as upper and lower surfaces in FIGS. 6A and 6B, of the cam groove 41. During this movement, although the elastic member 42 is in contact with the cam surfaces 41a, the elastic member 42 is rotatably fitted on the follower portion 40c and hence is capable of rotating along the cam surface 41a, so that the follower portion 40c can move along the cam groove 41 without frictional load.

FIG. 6B is a cross-sectional view of the essential parts of the link mechanism with the follower portion 40c of the follower pin 40 passing over a hard foreign matter 43, such as sand, attached to the lower one of the cam surfaces 41a of the cam groove 41.

As shown in FIG. 6B, during passage of the follower portion 40c over the foreign matter 43, the elastic member 42 rolls on the foreign matter 43 while being deformed according to the shape of the foreign matter 43. This makes it possible to prevent the foreign matter 43 from being tightly pressed against the cam surface 41a to damage the same or being caught between the follower portion 40c and the cam surface 41a to disable further movement of the follower portion 40c.

Figure 7A:
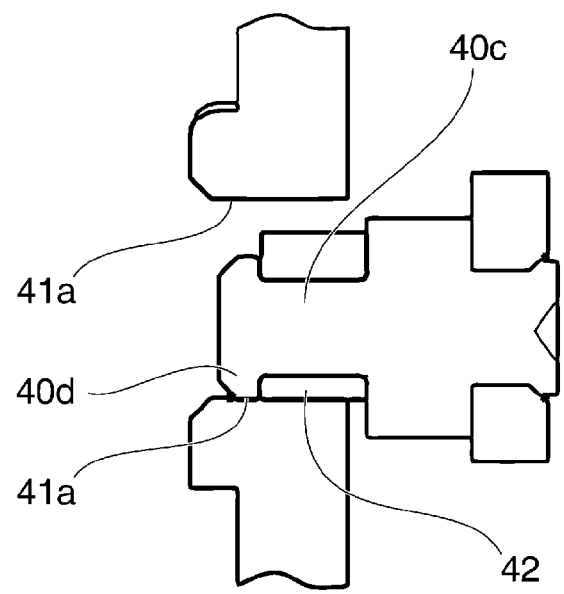
FIG. 7A is a cross-sectional view of the essential parts of the link mechanism with the follower portion of the follower pin pressed against the cam surface of the cam groove.

FIG. 7A is a cross-sectional view of the essential parts of the link mechanism with the follower portion 40c of the follower pin 40 pressed against the lower one of the cam surfaces 41a of the cam groove 41 as viewed in FIG. 7A.

When the user applies a certain force to the strobe unit 12 in a specific direction during movement of the movable member 19 of the strobe unit 12 between the light emission position and the retracted position, the follower portion 40c is sometimes pressed against one of the cam surfaces 41a of the cam groove 41.

When the follower portion 40c is pressed against one of the cam surfaces 41a of the cam groove 41, the elastic member 42 is compressed and deformed in a diametrical direction, and the increased diameter portion 40d of the front end of the follower portion 40c is brought into abutment with the cam surface 41a, as shown in FIG. 7A. Therefore, it is possible to prevent the elastic member 42 from being further compressed and deformed.

When the elastic member 42 made of rubber is repeatedly rolled in a compressed and deformed state, partial compression and release of the elastic member 42 is repeated, which progressively degrades the rubber of the elastic member 42, eventually resulting in rupture of the elastic member 42. The rate of degradation is proportional to the amount of compression. For this reason, the present embodiment is configured such that the increased diameter portion 40d is brought into abutment with the cam surface 41a when the elastic member 42 is compressed and deformed by a predetermined amount, to thereby prevent further compression of the elastic member 42. Thus, the elastic member 42 is prevented from rupturing before the strobe unit 12 is used an expected number of times.

Further, rubber degradation rate has a correlation with rubber hardness, and assuming that compression and release are repeated with the same amount of compression the same number of times, as the hardness of the rubber is higher, the rate of degradation of the same is higher. For this reason, in the present embodiment, the elastic member 42 is made of rubber whose hardness is not higher than 40 degrees.

Figure 7B:
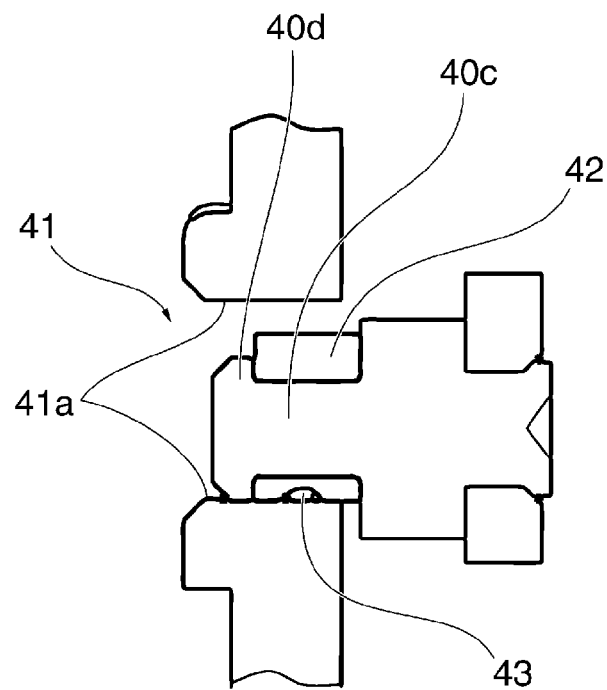
FIG. 7B is a cross-sectional view of the essential parts of the link mechanism with the follower portion of the follower pin passing over the foreign matter, such as sand, attached to the cam surface of the cam groove, while being pressed against the cam surface.

FIG. 7B is a cross-sectional view of the essential parts of the link mechanism with the follower portion 40c of the follower pin 40 passing over the hard foreign matter 43, such as sand, attached to the lower one of the cam surfaces 41a of the cam groove 41 as viewed in FIG. 7B, while being pressed against the cam surface 41a.

As shown in FIG. 7B, during passage of the follower portion 40c of the follower pin 40 over the foreign matter 43, the elastic member 42 rolls on the foreign matter 43 while being compressed and deformed according to the shape of the foreign matter 43. At this time, the increased diameter portion 40d of the front end of the follower portion 40c is brought into abutment with the cam surface 41a, so that the elastic member 42 cannot be further compressed and deformed.

If the front end of the follower portion 40c were not formed with the increased diameter portion 40d, the follower portion 40c would be further tightly pressed against the cam surface 41a, and the elastic member 42 would be further compressed and deformed. In such a case, when the amount of compression deformation of the elastic member 42 reaches its limit, the elastic member 42 will not be further deformed, causing a trouble that the foreign matter 43 scratches the cam surface 41a or that the foreign matter 43 is caught between the elastic member 42 and the cam surface 41a, disabling further movement of the follower pin 40. In the present embodiment, since the front end of the follower portion 40c is formed with the increased diameter portion 40d as described hereinbefore, it is possible to prevent occurrence of the above-mentioned problems.

Figure 8:
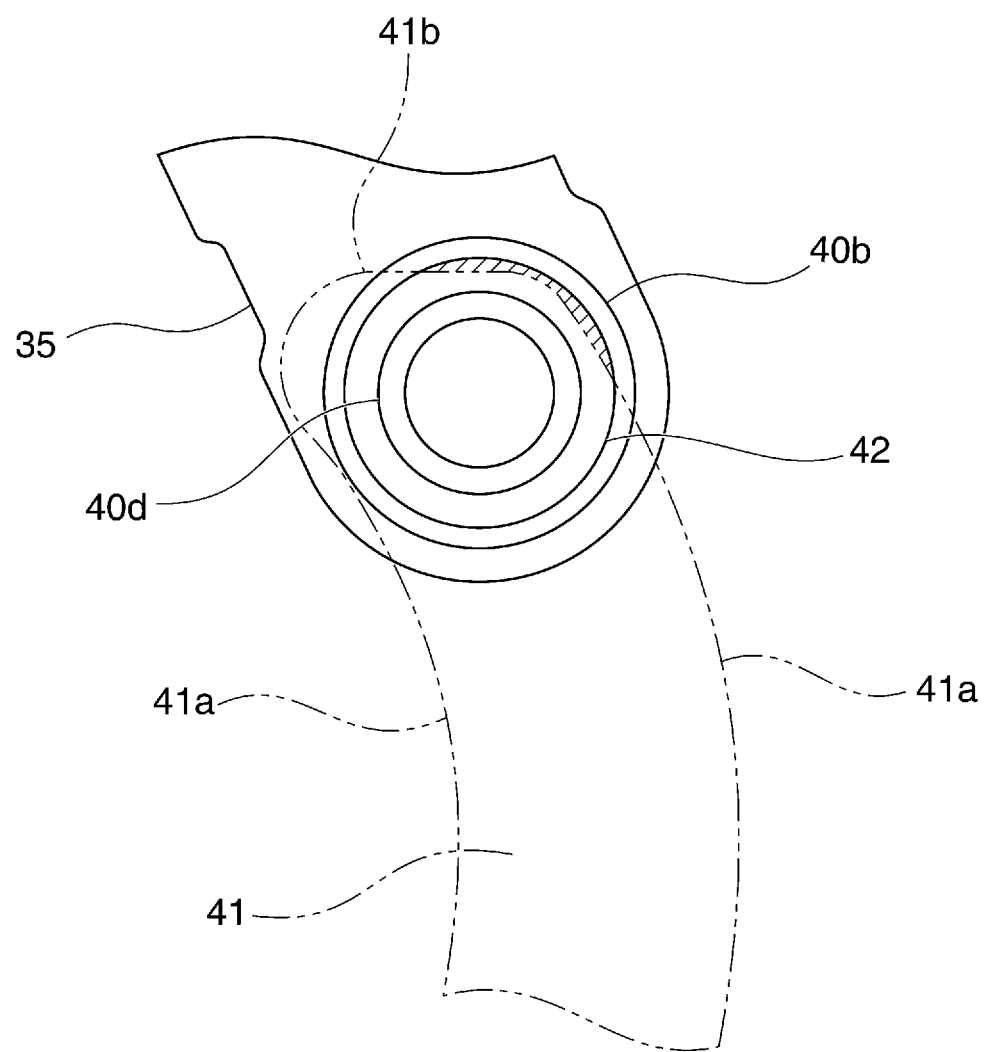
FIG. 8 is an enlarged view useful in explaining the relationship between the follower pin and the cam groove at a time when the movable member of the strobe unit is in the light emission position.

FIG. 8 is an enlarged view useful in explaining the relationship between the follower pin 40 and the cam groove 41 at a time when the movable member 19 of the strobe unit 12 is in the light emission position.

In a state shown in FIG. 8, the elastic member 42 is held in contact and pressed against a terminal end 41b of the cam surfaces 41a of the cam groove 41 and compressed and deformed such that a hatched portion in FIG. 8 is dented inward. During movement of the movable member 19 of the strobe unit 12 from the retracted position to the light emission position, the abutment portion 24d of the base member 24 and the abutment portion 22d of the link member 22 are brought into abutment with each other, and an abutment portion (not shown) of the movable member 19 and an abutment portion (not shown) of the link member 22 are brought into abutment with each other, as described hereinbefore. This limits the position of the movable member 19 to the light emission position.

At this time, impact noise is generated at each of the abutment portions due to the urging forces of the respective springs 26 and 25. However, the elastic member 42, which is compressed and deformed in the hatched portion in FIG. 8, serves as a damper to reduce collision speed between the abutment portions, thereby suppressing the impact noise.

Next, a detailed description will be given, with reference to FIGS. 9A to 12B, of movement of the movable member 19 of the strobe unit 12 from the retracted position to the light emission position.

Figure 10A:
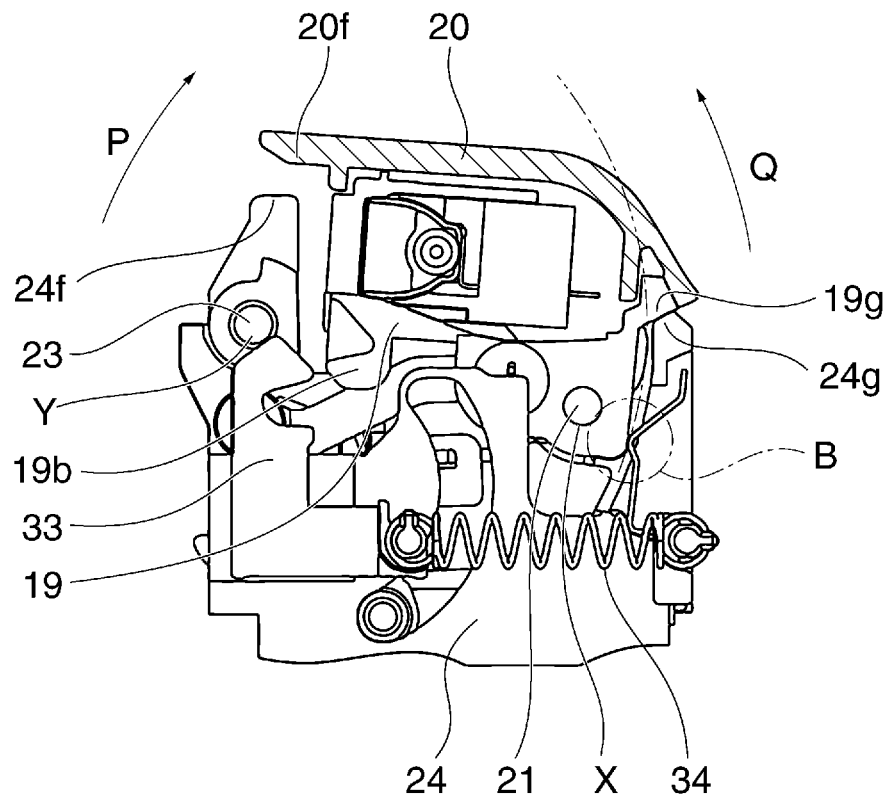
FIG. 10A is a side view, partly broken away, of the strobe unit with a lock lever moved from a state shown in FIG. 9A.
Figure 10B:
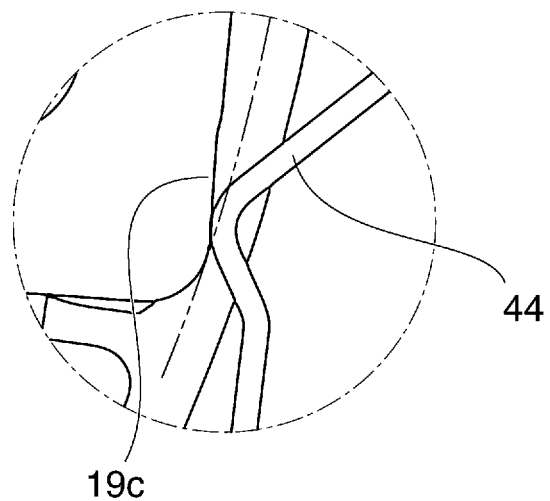
FIG. 10B is a partial enlarged view of a portion of FIG. 10A.
Figure 11A:
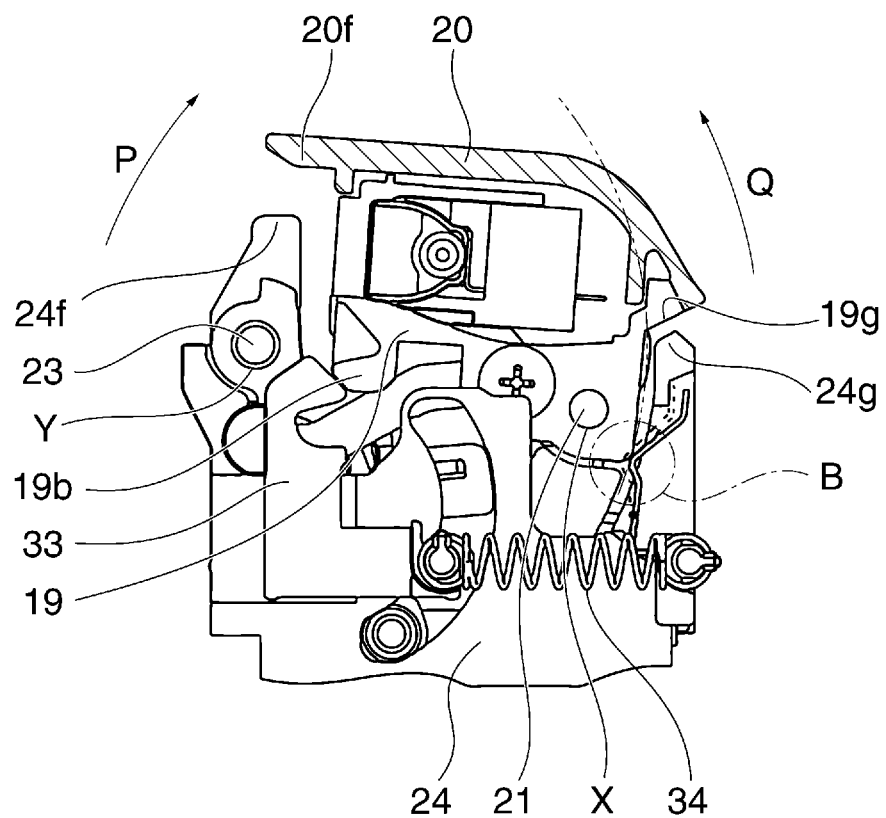
FIG. 11A is a side view, partly broken away, of the strobe unit with the movable member pivotally moved about a shaft.
Figure 11B:
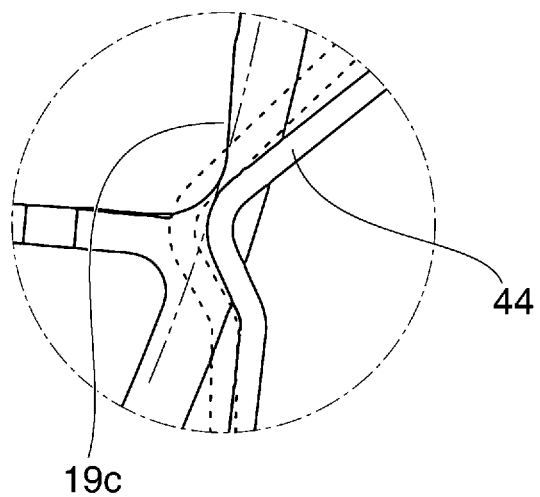
FIG. 11B is a partial enlarged view of a portion of FIG. 11A.
Figure 12A:
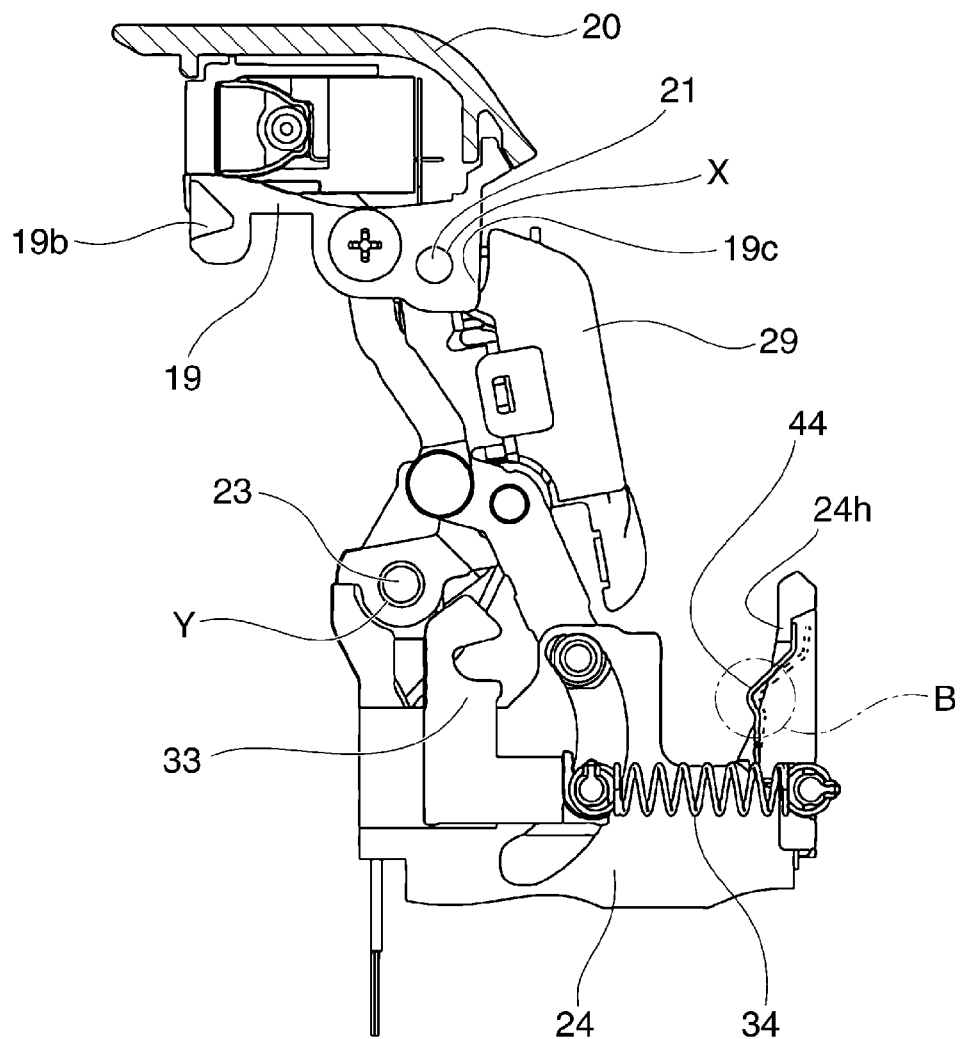
FIG. 12A is a side view, partly broken away, of the strobe unit with the movable member thereof moved to the light emission position.
Figure 12B:
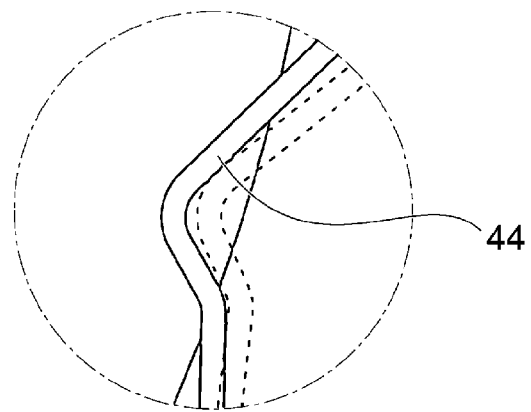
FIG. 12B is a partial enlarged view of a portion of FIG. 12A.

FIG. 9A is a side view, partly broken away, of the strobe unit 12 with the movable member 19 thereof in the retracted position. FIG. 9B is a partial enlarged view of a portion of FIG. 9A. FIG. 10A is a side view, partly broken away, of the strobe unit 12 with the lock lever 33 moved from the state shown in FIG. 9A. FIG. 10B is a partial enlarged view of a portion of FIG. 10A. FIG. 11A is a side view, partly broken away, of the strobe unit 12 with the movable member 19 pivotally moved about a shaft 21. FIG. 11B is a partial enlarged view of a portion of FIG. 11A. FIG. 12A is a side view, partly broken away, of the strobe unit 12 with the movable member 19 thereof moved to the light emission position. FIG. 12B is a partial enlarged view of a portion of FIG. 12A. Note that B in each of FIGS. 9A, 10A, 11A, and 12A indicates a portion of the lock plate 44, which is shown in detail on an enlarged scale in FIGS. 9B, 10B, 11B, and 12B.

First, referring to FIG. 9A, in a state where the movable member 19 is retracted in the base member 24, the movable member 19 is given a rotational force acting in a clockwise direction (P direction), as viewed in FIG. 9A, by the urging force of the spring 26 (see FIG. 4A) mounted on the shaft 21. This rotational force urges a front side, as viewed with respect to the camera body 1, of the movable member 19 to be lifted toward the upper surface of the camera body 1. However, the engaging pawl 19b of the movable member 19 is guided in a manner against the rotational force by the base member 24 and is disengageably brought into locking engagement with the lock lever 33, whereby the movable member 19 is held in the retracted position.

As described hereinbefore, the one end of the tensile spring 34 is hooked to the lock lever 33, and the other end of the same is hooked to the base member 24. Therefore, the lock lever 33 is always urged in a direction (R direction) in which the tensile spring 34 contracts, so that the lock lever 33 and the engaging pawl 19b of the movable member 19 are engaged with each other on a sloped plane.

When the tensile spring 34 contracts, a component force is generated for pulling the movable member 19 in a direction (S direction) toward the retracted position. At this time, an abutment portion 20f of the cover member 20 integrally fixed to a top of the movable member 19 is brought into abutment with an abutment portion 24f of the base member 24, whereby the position of the movable member 19 is restricted. This prevents the movable member 19 from being further pulled inward in the retraction direction (S direction).

As described above, in the retracted position, the front side of the movable member 19 with respect to the camera body 1 is always urged toward the base plate 24, i.e. in the pull-in direction (S direction), so that lift or play of the movable member 19 from the camera body 1 does not occur. Further, this makes it possible to realize a structure configured to prevent a level difference from being generated between the cover member 20 on top of the movable member 19 and exterior covers, such as the front cover 2 and the upper cover 4, surrounding the cover member 20.

Furthermore, the movable member 19 is given a rotational force acting in a counterclockwise direction (Q direction), as viewed in FIG. 9A, by the urging force of the spring 25 (see FIGS. 3A and 3B) mounted on the shaft 23. More specifically, the spring 25 urges the link member 22 (see FIG. 4A) in the Q direction, and the movable member 19 in the retracted position moves in accordance with the pivotal movement of the link member 22 and hence receives the rotational force acting in the Q direction.

The lock plate 44 is brought into abutment with a restriction portion 19c formed on the rear side (other end) of the movable member 19 so as to restrict the rotational force of the movable member 19 acting in the Q direction. At this time, the lock plate 44 locks the restriction portion 19c in an elastically deformed state as shown in FIG. 9B. In short, the restriction portion 19c functions as a second locked portion formed in the other end of the movable member. The lock plate 44 functions as a second locking member configured to lock a second locked portion. As shown in FIG. 9A, the restriction portion 19c is formed at a location close to the shaft 21 as the center of rotation of the movable member 19.

In FIG. 9B, broken lines indicate a natural state (unloaded state) of the lock plate 44, and two-dot chain lines indicate an outermost shape of a trajectory of pivotal movement of the movable member 19 about the shaft 23. As indicated in FIG. 9B, when the movable member 19 attempts to pivotally move about the shaft 23 in the Q direction, the movable member 19 comes into abutment with the lock plate 44 arranged on the trajectory of the pivotal motion, whereby further pivotal movement of the same is restricted.

Further, a rear side of the movable member 19 with respect to the camera body 1 is formed with an abutment portion 19g. The abutment portion 19g is brought into abutment with an abutment portion 24g of the base member 24, when the movable member 19 is in the retracted position. Therefore, even when manufacturing variations or the like cause a slight displacement of the position of the restriction portion 19c of the movable member 19, the lock plate 44 elastically follows the restriction portion 19c to prevent the movable member 19 from being lifted in the Q direction.

As described above, the restriction portion 19c formed in the rear side of the movable member 19 is brought into abutment with the base member 24 when the movable member 19 is in the retracted position, whereby the pivotal movement of the movable member 19 in the Q direction is restricted. This prevents play of the movable member 19 against the base member 24 or lifting of the same. Further, this makes it possible to realize a structure configured to prevent a level difference from being generated between the cover member 20 on top of the movable member 19 and the exterior covers, such as the rear cover 3 and the upper cover 4, surrounding the cover member 20.

FIGS. 10A and 10B show a state where the movable member 19 has been pivotally moved slightly in the P direction by the operation of the release lever 13, which caused the lock lever 33 to move and thereby caused the engaging pawl 19b of the movable member 19 to be disengaged from the lock lever 33 to release restriction of pivotal movement of the movable member 19 about the shaft 21 in the P direction. In this state, the restriction portion 19c of the movable member 19 is in abutment with the lock plate 44 to thereby restrict pivotal movement of the movable member 19 about the shaft 23 in the Q direction. Locking engagement between the engaging pawl 19b and the lock lever 33 is released in a manner interlocked with the operation of the release lever 13, but locking engagement between the restriction portion 19c and the lock plate 44 is not released. In other words, when the release lever 13 is operated, locking engagement between the engaging pawl 19b and the lock lever 33 is released without releasing locking engagement between the restriction portion 19c and the lock plate 44.

FIGS. 11A and 11B show a state where the movable member 19 has been further pivotally moved in the P direction from the state shown in FIGS. 10A and 10B. The restriction portion 19c is disengaged from the lock plate 44 during the pivotal movement of the movable member 19 about the shaft 21 in the P direction, whereby the restriction of the pivotal movement of the movable member 19 about the shaft 23 in the Q direction is released.

Then, the movable member 19 is moved by the urging forces of the respective springs 25 and 26 toward the light emission position shown in FIGS. 12A and 12B. At this time, the load applied to the lock plate 44 has been removed, and hence the lock plate 44, which was held elastically deformed in the retracted position, has returned to its natural state. The lock plate 44 has one end thereof configured to come into abutment with a restriction portion 24h formed in the base member 44 so as to prevent the lock plate 44 from further falling inward. Note that the present embodiment employs the four-joint mechanism as described hereinbefore, and therefore the movable member 19 is moved from the retracted position to the light emission position, with its position held substantially horizontal.

In the light emission position, the restriction portion 19c of the movable member 19 is covered by the protective member 29 rigidly secured to the link member 22. Further, it is envisaged that since the restriction portion 19c slides over the lock plate 44 during movement of the movable member 19 between the retracted position and the light emission position, the lock plate 44 is damaged e.g. by being scratched. However, a scratch or sliding mark on the lock plate 44 cannot be seen from outside, and therefore there is no fear that the appearance of the camera is degraded.

During movement of the movable member 19 from the light emission position to the retracted position, the restriction portion 19c of the movable member 19 moves over the lock plate 44 while elastically deforming the lock plate 44 which has returned to its natural state. Further, the end of the engaging pawl 19b of the movable member 19 moves over the end of the lock lever 33 and comes into locking engagement with the lock lever 33, whereby the movable member 19 is held in the retracted position shown in FIGS. 9A and 9B.

As described above, in the present embodiment, the front side of the movable member 19 with respect to the camera body 1 is held in the retracted position by locking engagement of the engaging pawl 19b with the lock lever 33. Further, in the retracted position, as for the rear side of the movable member 19 with respect to the camera body 1, the restriction portion 19c of the movable member 19 is brought into abutment with the lock plate 44, whereby the pivotal movement of the movable member 19 in the Q direction is restricted.

Thus, in a case where the support mechanism having the two rotating shafts 21 and 23 is used to move the movable member 19 having the light emission unit 14 between the retracted position and the light emission position, it is possible to prevent the movable member 19 from being lifted relative to the camera body 1 and a level difference from being generated between the camera body 1 and the movable member 19 when the movable member 19 is in the retracted position, at a low cost.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-004244 filed Jan. 14, 2014 which is hereby incorporated by reference herein in its entirety.

What is claimed is:

1. An image pickup apparatus including a flash configured to move between a retracted position where the flash is retracted in an apparatus body and a flash position where the flash protrudes from the apparatus body, comprising:
   a movable body having the flash;
   a support having one end pivotally supported by the apparatus body and the other end pivotally supporting said movable body;
   a first spring configured to urge said support;
   a second spring configured to urge said movable body;
   a first lock configured to lock a first locked portion formed in one end of said movable body against urging forces of said respective first and second springs when the flash is in the retracted position; and
   a second lock configured to lock a second locked portion formed in the other end of said movable body against the urging forces of said respective first and second springs when the flash is in the retracted position,
   wherein when the flash is in the retracted position, release of a locking engagement between said first lock and said first locked portion causes said movable body to pivotally move with respect to said support by the urging force of said second spring, and
   wherein the pivotal movement of said movable body with respect to said support releases locking engagement between said second lock and said second locked portion, and said support is pivotally moved with respect to the apparatus body by the urging force of said first spring, whereby the flash is positioned in the flash position.

2. The image pickup apparatus according to claim 1, wherein the one end of said movable body is formed with a light emitting surface, and the other end of said movable body is pivotally supported by said support,
   wherein said first locked portion is formed on said movable body at a location close to the light emitting surface, and
   wherein said second locked portion is formed on said movable body at a location close to a center of pivotal movement of said movable body with respect to said support.

3. The image pickup apparatus according to claim 1, wherein said second lock is formed of an elastic material.

4. The image pickup apparatus according to claim 1, further comprising a protective cover rigidly secured to said support,
   wherein when the flash is in the flash position, said second lock is covered by said protective cover.

5. The image pickup apparatus according to claim 1, further comprising an release lever, and
   wherein when said release lever is operated with the flash in the retracted position, locking engagement between said first lock and said first locked portion is released without releasing locking engagement between said second lock and said second locked portion.

* * * * *